Jan. 10, 1967  R. C. WEBSTER ET AL  3,297,454
CURTAILED IMMERSION FOOD FREEZING
Original Filed July 2, 1964
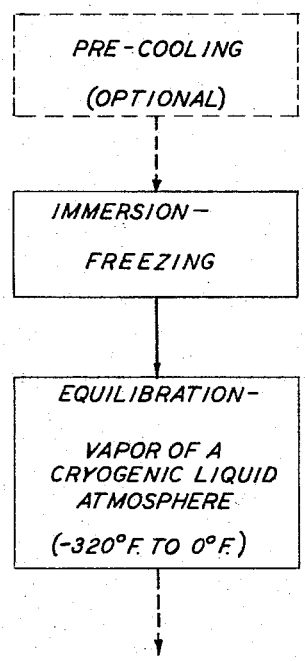
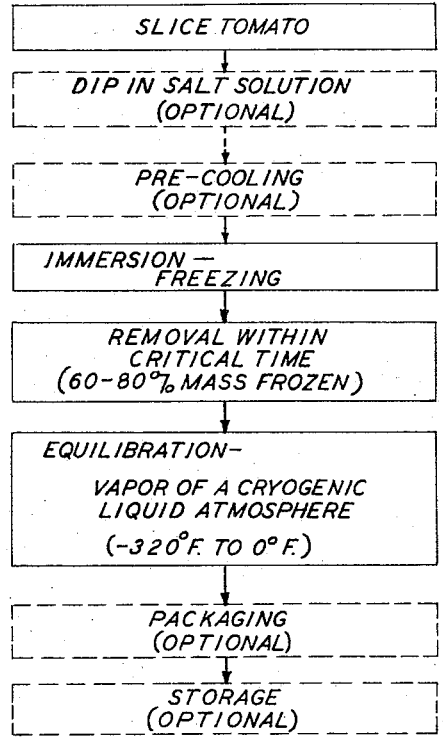
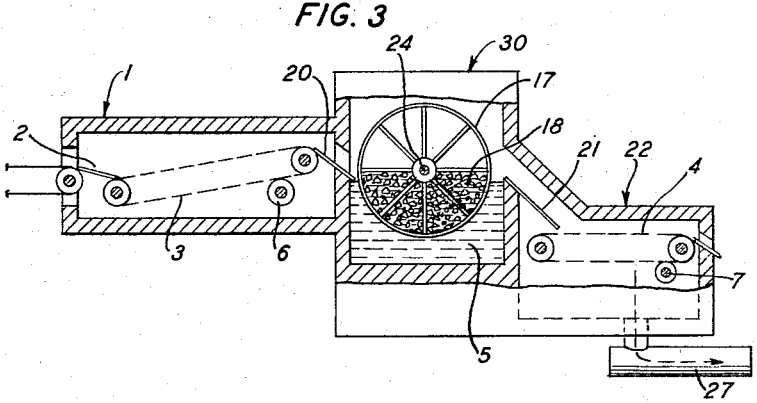
INVENTORS ROBERT C. WEBSTER
ERNEST J. BENSON
BY
ATTORNEY United States Patent Office 3,297,454
Patented Jan. 10, 1967

3,297,454
CURTAILED IMMERSION FOOD FREEZING
Robert C. Webster and Ernest J. Benson, both of Madison, Wis., assignors to Air Reduction Company, Incorporated, New York, N.Y., a corporation of New York
Continuation of application Ser. No. 379,960, July 2, 1964. This application Feb. 3, 1966, Ser. No. 524,809
2 Claims. (Cl. 99—193)

This application is a continuation of application Serial No. 379,960, filed July 2, 1964, now abandoned, which application is a continuation-in-part of application Serial No. 275,932, filed on April 26, 1963, now Patent No. 3,250,630, which last mentioned application is a continuation-in-part of application Serial No. 154,622, filed November 24, 1961, and now abandoned.

This invention relates to the preservation of articles of food as a result of immersion in a cryogenic liquid bath.

More particularly, this invention relates to the preservation of fruits and vegetables of a certain class by placing them in contact with a cryogenic liquid in the form of a bath or its equivalent in order to freeze the said fruits and vegetables.

More particularly, this invention relates to the rapid freezing of fruits and vegetables, for example, pears, peaches, and tomatoes, normally subject to cracking and splitting as a result of cryogenic shock upon immersion in a cryogenic liquid bath for freezing thereof.

A number of different methods have been employed to preserve articles of food. Food preserving techniques such as drying, canning, preserving in syrups, etc., have long been known to the industry. These techniques, however, do not result in an article of food which has taste or product characteristics similar to those characteristics before the preservation technique was employed.

In recent years, preservation of food as a result of freezing has been adopted.

It has been proposed in the past to freeze food products in brine solutions; however, freezing of food products in brine is relatively slow, results in damaging crystal growth, the problems resulting therefrom discussed below, and often lends to the food products an undesirable taste or odor.

Of the various methods employed for freezing food products, an exemplary and popular one is the "Individual Quick Frozen" (IQF Freezing) method. According to this method, with, of course, individual variations according to the article of food frozen and the techniques adopted, the article of food is subjected to a sub-freezing gaseous blast in a "tunnel" for a sufficient time to freeze the product solidly throughout. This conventionally requires freezing times up to several hours.

While this last-mentioned method of freezing is often referred to as "quick freezing," there is substantial cell destruction within the article of food as a result of crystal growth during the freezing process. Such crystal growth results from the change of state of the moisture from liquid to solid within the article of food. Generally, the slower the freezing rate, the larger the ice crystal formed. The freezing time, using the "quick freezing" method just described, allows for such crystal growth to occur. The crystal growth characteristics of the above freezing technique results in rupture or fracture of the internal structure of the article of food, and when the product is thawed, it loses its firmness and collapses. It is characteristic of articles of food frozen according to the above method that they lose a large percentage of their natural juices upon thawing. This loss of natural juices is known as "drip loss." The loss of the internal structure of the article of food and the loss of natural juices just discussed are significantly damaging to the desirability and marketability of the food articles.

It has been proposed, in order to overcome the problems resulting from excessive and damaging crystal growth when articles of food are frozen according to a "quick freezing" method similar to that described immediately above, that the food article be frozen as a result of immersion in contact with a cryogenic liquid bath. In this extremely rapid freezing technique, there is relatively small and therefore virtually non-damaging crystal growth due to the shortness of time necessary to freeze the articles of food, usually at most a matter of several minutes.

Immersion of food products in a cryogenic liquid bath is disclosed in the patent to Hill, No. 2,447,249, of August 17, 1948. The Hill patent does not disclose the inventive freezing process for most fruits and vegetables set forth in detail hereinbelow.

The patent to Morrison, No. 3,055,760, of September 25, 1962, discloses the rapid freezing of a particular food, bacon by immersion in a cryogenic liquid, but, again, does not disclose the inventive freezing process for most fruits and vegetables which is the subject of this application.

Most fruits and vegetables, when frozen as a result of immersion in a bath of cryogenic liquid crack or split as a result of cryogenic shock. The extremely rapid freezing of the articles of food, with corresponding small crystal growth, results in a build-up of pressure within the said articles. In the case of many fruits and vegetables, this build-up of pressure within particular articles during the extremely rapid freezing results in an "explosion" within the article and a resultant splitting which apparently relieves the internal pressure. Such build-up of pressure during the immersion of the fruits or vegetables while being frozen in a bath of cryogenic liquid and the resultant splitting is known as "cryogenic shock."

In the context of this disclosure, a cryogenic temperature or the temperature of a cryogenic liquid is a temperature of about −100° F. or below.

The immersion bath of cryogenic liquid may be of nitrogen or nitrous oxide. Nitrogen and nitrous oxide are desirable because of their low boiling point, their inertness, and the fact that they can be used as a liquid under atmospheric conditions. They are particularly suited for freezing articles of food without imparting any undesirable taste characteristics to the food.

The cryogenic shock referred to above occurs in most fruits and vegetables upon their immersion in a cryogenic liquid bath. The cryogenic shock which is evidenced by the splitting or cracking at the surface of the articles of food occurs as a result of the extremely rapid freezing of the fruit or vegetable while in contact with the cryogenic liquid. The heat transfer from the warm product to the cold cryogenic liquid, the liquid being at a temperature of about −320° F. in the case of nitrogen or about −128° F. in the case of nitrous oxide, apparently results in the build-up of great pressures inside the individual fruit or vegetable food article. Generally, if the individual article is frozen completely, said pressures cannot be absorbed by any part of the article and a cracking of the article occurs apparently in order to vent such pressure. The outside areas of the food article obviously freeze first because they are in contact with the cryogenic liquid during the immersion freezing; the center portion of the fruit and vegetable remains relatively warm. Upon freezing, the outside areas contract. The disparity between the cold outside areas and the warm inside areas apparently creates pressures which cannot be absorbed by the warmer inside area if it is freezing so fast as to not remain in a pliable state to absorb such pressures. The present invention recognizes this problem and provides a method of immersion freezing articles of food subject to cryogenic shock upon immersion in a cryogenic liquid bath which avoids the splitting and cracking apparently resulting from the build-up of pressure described above.

It is emphasized that the problem of cryogenic shock discussed above does not occur in the freezing of the class of articles of food subject to cryogenic shock when frozen as a result of contact with brine or the slow freezing methods earlier discussed, since the freezing is not so rapid as to build up the internal pressure which causes the cracking or splitting. It is highly desirable, however, to freeze these articles of food according to the immersion freezing method discussed, since the crystal growth is thus kept to a minimum and the articles of food, besides retaining the taste and visual characteristics of the freshly picked product which is so highly desirable, retain a much higher percentage of their moisture, because of a lack of rupture, which is desirable as to both taste and economics. This is demonstrated in Table I relating to pears and peaches.

TABLE I.—MOISTURE LOSS UPON FREEZING

|  | Tray [1] | Blast [2] | Nitrogen [3] |
| --- | --- | --- | --- |
| Pears | 8.5% | 12% | 0.6% |
| Peaches | 8.5% | 12% | 0.6% |

[1] Food articles placed on open trays in cold room environment.
[2] Cold air rapidly circulated over food articles in cold room environment.
[3] Food articles immersed in liquid nitrogen bath according to process of this disclosure.

Taking for the purposes of example, a cost of $0.25/pound for peaches or pears, the expense of product loss is dramatically reduced by use of freezing techniques utilizing a liquid nitrogen bath as shown in Table II.

TABLE II.—COST OF PRODUCT LOSS

|  | Pears [1] | Peaches [1] |
| --- | --- | --- |
| Tray | $0.021/lb | $0.021/lb |
| Blast | 0.03/lb | 0.003/lb |
| Nitrogen | 0.00015/lb | 0.00015/lb |

[1] Figures arrived at by multiplying per cent of moisture loss upon freezing by cost/lb. to arrive at cost of percentage of moisture lost per pound.

For a mere 10,000 pounds of food frozen the savings would be as follows:

TABLE III.—COST OF PRODUCT LOST

|  | Pears | Peaches |
| --- | --- | --- |
| Tray | $210.00 | $210.00 |
| Blast | 300.00 | 300.00 |
| Nitrogen | 1.50 | 1.50 |

When it is realized that immersion freezing with nitrogen not only saves on product loss, but, more important, results in a product without substantial and damaging crystal growth during freezing, which crystal growth would destroy a large percentage of the desirable characteristics of the product, it becomes clear that this invention provides a process for immersion freezing of those fruits and vegetables which previously could not be immersion frozen because of the damage of cryogenic shock.

It is further emphasized that the problem of cryogenic shock does not usually occur where articles of food are sprayed with a cryogenic liquid, unless such spraying is the full equivalent in terms of the quantity of spray to food product to immersion in a cryogenic liquid bath. Cryogenic shock does not occur because the technique of spraying food products to rapidly freeze them does not result in as rapid a heat transfer as from direct immersion in the liquid and the pressures which cause cracking or splitting under cryogenic shock do not build up within the food product at as high a rate. Of course, larger crystal growth within the article occurs during spraying than during immersion. Where, of course, the spraying is of such quantity as to be the full equivalent of the immersion of food product, then cryogenic shock will occur in the certain class of fruits and vegetables previously mentioned, and the problem discussed arises.

It is an object of this invention to provide an improved method for rapidly freezing fruits and vegetables with relatively small resulting ice crystal growth within the fruit or vegetable, which ice crystal growth does not destroy the internal structure of the particular fruit or vegetable, such rapid freezing being performed in a manner so as not to cause fracture or cracking of the particular fruit or vegetable.

It is further an object of this invention to provide an improved method for preserving fruits and vegetables so as to avoid damaging ice crystal growth and splitting or cracking caused as a result of cryogenic shock.

It is further an object of this invention to provide an improved method for freezing a certain class of fruits and vegetables as a result of immersion in a cryogenic bath so as to avoid (1) significant ice crystal growth and configuration within the particular fruit or vegetable and (2) the cracking and splitting of the particular fruit or vegetable which occurs as a result of cryogenic shock.

A further object of this invention is to provide a method for rapid freezing of fruits or vegetables, or slices or pieces of fruits or vegetables, subject to damage as a result of cryogenic shock upon immersion in a bath of liquefied gas such as nitrogen or nitrous oxide.

Further objects and advantages of this invention will become more apparent upon examination of the following more detailed disclosure.

In general, the inventors have discovered the following process for rapid freezing of fruits and vegetables subject to cracking or splitting upon freezing thereof by immersion in a liquid cryogenic bath.

According to this invention fruits or vegetables which are subject to cryogenic shock upon immersion freezing in a bath of cryogenic liquid are removed from the cryogenic liquid before they are frozen throughout. It has been found that 60 to 80 percent of the mass of such fruits and vegetables advantageously should be frozen while in contact with the cryogenic liquid bath. The time necessary to freeze from 60 to 80 percent of a particular sized fruit or vegetable article is determined experimentally by removing that sized article from the immersion bath and cutting it open to measure the mass frozen in relation to the whole. After removal from the bath, said fruits and vegetables are then allowed to equilibrate to the desired temperature in a vapor atmosphere of a temperature from −320° F. to 0° F., wherein the freezing of the mass unfrozen while in contact with the cryogenic liquid bath is completed. Since only 60 to 80 percent of the mass of the particular fruit or vegetable article is frozen while in contact with the liquid bath, the pressure which is built up as a result of the rapid freezing apparently is absorbed by the unfrozen center portion of the fruit or vegetable. In other words, the contracting of the frozen outside areas of the fruit or vegetable apparently is absorbed by the pliable, unfrozen center. A more gradual freezing of the center mass occurs during a period of equilibration of temperature in the cryogenic vapor environment than would occur from direct contact with the cryogenic liquid, resulting in slower rate of freezing of the center mass than the rate of freezing of the 60 to 80 percent previously frozen. The unfrozen center thus is apparently able to absorb the pressures built up during freezing of the 60 to 80 percent mass while the article is immersed in the cryogenic liquid bath without cracking or splitting occurring. The center is then frozen at a slower rate as a result of equilibration of temperature in a vapor atmosphere of below 0° F., without the extra pressures resulting.

By the above method of freezing, the article is frozen without the harmful effects resulting from cryogenic shock, but with the positive benefits of rapid freezing resulting from contact with a cryogenic media. The temperature range (—320° F. to 0° F.) of the vapor atmosphere in which the equilibration takes place, resulting in the freezing of the center portion of the article is of substantial importance. The maintaining of the temperature of the equilibration atmosphere (sometimes known as post-cooling atmosphere) within said range hastens the freezing of the center portion of the fruit or vegetable article of food, since it is markedly below the freezing temperature of said article and maintains the temperature gradient between the outside of the article and center of the article during equilibration before the center solidifies to a minimum. The equilibration atmosphere further controls the temperature of the outside area of the individual fruit or vegetable food article, as the outside area absorbs heat from the warmer inside area of the article keeping it below a certain maximum temperature. Furthermore, the maintaining of the outside area of the article below a critical temperature, usually below 0° F. serves to keep the outside skin or surface of the article below 0° F. and dry and thus avoids the sticking together or "clumping" of the individual fruit or vegetable during this equilibration period which occurs if the outside surfaces warm up. Furthermore, the equilibration of the article in an atmosphere of vapor of liquid nitrogen or nitrous oxide keeps harmful oxygen from the article. The use of the cold off-gases from the immersion bath in the equilibration or post-cooling atmosphere is economic, as it results in a high utilization of the total refrigeration available in the cryogenic media of the bath.

The fruit or vegetable food article may be precooled before contact with the bath, if desired, in order to lower the temperature of the article to near freezing point and contribute to the economics of the process.

As discussed above, this invention is related to particular fruits and vegetables which are subject to cryogenic shock when frozen as a result of contact with liquid nitrogen or nitrous oxide in an immersion bath. Examples of such fruits and vegetables are: pears, peaches and tomatoes. If the fruit or vegetable article is relatively large, it may be advantageous to cut or slice it into smaller units, to avoid too great a pressure build up in the article and subsequent cracking due to the extensive mass of the article.

The invention will now be described with more particularity in relation to the following drawings:

FIGURE 1 diagrammatically illustrates the general steps involved in this invention.

FIGURE 2 illustrates the general process steps with relation to the freezing of a particular vegetable—tomatoes.

FIGURE 3 illustrates a freezing apparatus which is exemplary of the type of apparatus which might be used to carry out this invention.

As shown in FIGURE 1 and as described earlier in this disclosure, it is my intention to disclose a method whereby those fruits and vegetables which are subject to cryogenic shock, that is splitting and cracking when immersed in a cryogenic liquid and frozen substantially throughout while in the cryogenic liquid, may be rapidly frozen as a result of immersion in a cryogenic liquid bath. The articles of food (fruit or vegetable) are introduced into the cryogenic liquid bath, preferably liquid nitrogen or nitrous oxide, at a temperature of —100° F. or below, for a period of time sufficient to freeze 60 to 80 percent of the mass of the individual fruit or vegetable. The article is then removed or conveyed from the liquid bath and allowed to equilibrate in an atmosphere of vapor from a cryogenic liquid at a temperature of from —320° F. to 0° F. The freezing of the article is completed during this equilibration period, without, as discussed previously, (1) cracking or splitting occurring, (2) the temperature of the outer area rising above a certain upper limit significantly below the freezing point of the article, (3) without the sticking together of the articles, and (4) substantial amounts of harmful oxygen coming into contact with the article. Furthermore, the vapor of a cryogenic liquid atmosphere serves to increase the refrigeration effect on the unfrozen portion of the fruit or vegetable so as to increase its rate of freezing and avoid significant crystal growth. The time of freezing during actual immersion so as to freeze from 60 to 80 percent of the article varies according to the particular article involved, and its size. Likewise, the equilibration period time also varies.

As illustrated in FIGURE 1, a pre-cooling step may be added to that described in order to increase the economics of the freezing operation. Of course, depending on the particular food article involved, other steps may be added, if desired, such as peeling, blanching, packaging, etc.

A specific example of the freezing operation utilized above in order to avoid cryogenic shock in the immersion freezing of fruits and vegetables subject to such cryogenic shock upon immersion in a cryogenic liquid bath will now be described in the case of tomatoes. Such disclosure was made earlier in relation to tomatoes in United States application Serial No. 154,622 and continuation-in-part application 275,932, of which applications this application is a continuation-in-part. Said earlier applications disclose a species of the generic invention described in this application.

In the case of tomatoes, the tomatoes are cut into pieces, preferably slices cut substantially normal to the core of the tomato. The reason for cutting the tomato into pieces is that experience has shown that there is no marketable variety of tomato that can be frozen all the way through by quick freezing in an uncut state, even with removal from the immersion bath before complete freezing, without having the outer portions of the tomato crack, or without achieving appreciable quality loss and damage to texture. The mass of the whole tomato is just too large and the internal pressures which build up are too great. By a unique combination of quick freezing, limiting the mass (of tomato slices frozen during the period of immersion) and control of freezing time this invention makes it possible to freeze tomatoes and subsequently thaw them without impairing the appearance, texture or taste of the sliced or wedged tomato.

The tomato pieces may be subjected to soaking in a salt solution for the purpose of firming them prior to freezing, if desired.

The tomato pieces are then quickly frozen by immersion in a bath of liquefied gas, preferably nitrogen or nitrous oxide. The temperature of the freezing bath is at least as low as about —100° F. Above that temperature the problems of cracking and splitting resulting from cryogenic shock would not develop, but the freezing would not be rapid enough to freeze the article without substantial growth of damaging crystal growth and moisture loss.

Before immersion, if desired, the tomato slices or wedges may be pre-cooled by contact with a cold aqueous solution, such as the salt solution mentioned in the penultimate paragraph, or by contact with the vaporized liquefied gas emanating from the bath upon contact of the article with the cryogenic liquid.

During the time of immersion, each piece is placed in direct contact with the liquid bath. A heavy spraying of the pieces with liquefied gas which keeps the pieces soaked as if they are actually submerged in the bath of liquefied gas is to be considered immersion for purposes of this invention.

The immersion freezing of the pieces or wedges of tomatoes is limited in order to avoid the fracturing or cracking of said pieces as a result of a contact with the liquefied gas which is too long. It has been found that freezing of the pieces, while in contact with the immersion bath media, so that 60 to 80 percent of the mass is frozen will avoid the undesirable cracking and splitting that occurs if the immersion in the bath is over-extended. Because the center of the tomato piece is not frozen, the contraction of the frozen outer areas resulting in pressures within the piece is apparently absorbed by the relatively soft, pliable, warmer center portion of the piece.

The pieces of tomato are withdrawn from the liquefied gas before they have been submerged long enough to cause cracking, that is, before more than 80 percent of the tomato piece is solidly frozen. One quarter inch slices of tomato immersed for longer than 50 seconds in an immersion bath cool substantially below 0° F., but crack. However, a one quarter inch slice of tomato will freeze, with an equilibration period, and reach a temperature of 0° F. in a lesser time of immersion in nitrogen or nitrous oxide, with no cracking. There is some slight variation of time, dependent upon the initial temperature, the variety of the tomato and the degree of ripeness.

In accord with the figures just indicated, according to this invention, the one quarter inch slices are withdrawn from the bath in approximately 25 seconds, not being completely frozen and are allowed to equilibrate and freeze thoroughly in an equilibration atmosphere of vapor of a cryogenic liquid in a temperature range from —320° F. to 0° F. The period for completion of the freezing process normally will vary according to the grade of tomato involved, the ripeness of the tomato involved, the mass of the slice involved, etc. During the equilibration period, heat is conducted from the center interior portion of the slice to the outer portions, which outer portions are substantially below freezing temperature as a result of the immersion. The center portion apparently absorbs at least a part of the pressures created during the immersion period, as previously discussed, and freezes more slowly during the equilibration period than if it were frozen while in contact with the liquid cryogenic media, thus insuring the absence of pressures within the slice which would create splitting and cracking. Other advantages attendant to allowing the slices to equilibrate in an atmosphere of vapor of a cryogenic liquid of a temperature below 0° F. have previously been discussed.

Tomato slices ⅜" in thickness require slightly longer for freezing and the optimum immersion time in liquid nitrogen or nitrous oxide is between about 35 to 55 seconds. The ⅜" slices are removed from the freezing bath before they are frozen completely throughout and the freezing continues to completion by conduction from the center interior portion into the outer portion of the piece outside of the bath in the equilibration atmosphere created by vapor of a cryogenic liquid, as previously discussed in detail.

It is desirable to freeze the pieces sufficiently while in contact with the cryogenic bath so that the final temperature of the pieces after equilibration in the vapor of a cryogenic liquid atmosphere is about 0° F. The maintaining of the equilibration atmosphere at temperatures from —320° F. to 0° F. as desired, results in a control on the rate of freezing of the center portion of the tomato slice while in the equilibration atmosphere, a control of the final outside temperature of said slice, and elimination of the prospect of the slices clumping together.

After the freezing operation is completed, the tomato slices or pieces may be packaged, for example, in sealed envelopes with a particular atmosphere created therein, if desired, as further discussed in applications Serial No. 154,622, now abandoned, and Serial No. 275,932, now Patent No. 3,250,630, issued on May 10, 1966.

Table II is a chart compiling information as to the times and temperatures in the freezing of a tomato slice ⅜" to ½" in thickness. Starting at approximately room temperature (67° F.), the slice was first pre-cooled to a temperature of 30° F. before immersion. The tomato slice is withdrawn from immersion in the freezing bath after 30 to 60 seconds, the mass being 60 to 80 percent frozen, and the center portion frozen as a result of equilibration to 0° F. thereafter. Because the article is not completely frozen during the time of immersion, as discussed fully in previous paragraphs, the cracking and splitting which normally occurs in the case of tomatoes as a result of immersion in a cryogenic liquid bath is obviated.

TABLE IV.—⅜" TO ½" TOMATO SLICE

Freezing Step:                           Time Range
   Immersion freeze (60 to 80% of mass).   30 to 60 seconds.
   Equilibration in vapor of cryogenic liquid atmosphere (—320° F. to 0° F.).   Variable according to temperature, size, ripeness, grade, etc.

| | Analysis of Temperatures | | |
|---|---|---|---|
| | $T_1{}^a$ | $T_2{}^b$ | $T_3{}^c$ |
| Outside surface of slice. | 30° F | —30° F. to —320° F. | Temperature of post-cool area (—15° F. approx.). |
| Center area of slice. | 40° F | 40° F | —5° to —15° F. approx. | a Temperature before immersion.
b Temperature after immersion—60 to 80% of mass of slice frozen.
c Temperature after equilibration in vapor of cryogenic liquid atmosphere.

Table V summarizes the essential data for freezing fruits or vegetables subject to cryogenic shock upon immersion in a cryogenic liquid bath, with data for one particular example.

TABLE V.—PEARS, PEACHES AND OTHER

| | Fruits and Vegetables | ⅜" to ½" Tomato Slices |
|---|---|---|
| (1) Mass frozen during immersion. | 60 to 80% | 60 to 80%. |
| (2) Cryogenic Media. | $N_2$(—320° F.) $N_2O$(—128° F.) | $N_2$(—320° F.). $N_2O$(—128° F.). |
| (3) Time of immersion. | Varies according to mass of particular food article. | 30 to 60 sec. |
| (4) Equilibration atmosphere. | Vapor of cryogenic liquid at a temperature at or below 0° F. | Vapor of cryogenic liquid at a temperature at or below 0° F. |
| (5) Temperature of equilibration atmosphere. | —320° F. to 0° F. | —320° F. to 0° F. |
| (6) Temperature of center portion of article after equilibration. | 0° F. or below. | 0° F. or below. |
| (7) Pre-cooling step. | Optional. | Optional. |

It is not intended that the invention be limited to the freezing of any particular fruit or vegetable, but rather is intended to point out that the process of this invention may be used to successfully and rapidly freeze any fruit or vegetable subject to cryogenic shock upon immersion freezing in a cryogenic liquid bath.

It is not my intention that the disclosed method of freezing fruits and vegetables subject to cryogenic shock upon immersion be limited to the use of any particular apparatus. However, an example of freezing apparatus will be described in order to exemplify a type of apparatus which might be employed. It is emphasized that the carrying out of the freezing method of this invention is not limited to any particular apparatus.

FIGURE 3 shows a continuously operating immersion freeze apparatus which can be employed in carrying out the method of this invention for freezing fruits and vegetables normally subject to the effects of cryogenic shock upon immersion in a bath of cryogenic liquid.

This first section of the immersion freeze apparatus 1 of FIGURE 3 is inclined at an angle from the horizontal, for example but not limited to an angle of 10°, the infeed end 2 being inclined downwardly from the immersion-freeze area 30, to be described more particularly hereinafter.

The articles of food enter the immersion-freeze apparatus 1 at infeed end 2 on a conveyor belt 3. The conveyor belt 3 is preferably of a metal mesh material, for example stainless steel. The articles progress on the conveyor belt 3 toward the immersion freeze area 30. Immersion bath 5, of liquid nitrogen or nitrous oxide, in immersion bath area 30, receives articles of food therein. The food articles are transported from conveyor belt 3 into the bath 5 over dead plate 20. In like manner, dead plate 21 transfers the partially frozen food articles from the immersion freezing area 30 to moving belt 4 for equilibration of temperature in equilibration or post-cooling area 22 according to the method fully disclosed hereinbefore.

The equilibration area 22 utilizes the vaporized cryogenic liquid from the immersion freezing area 30 for creating the vapor of a cryogenic liquid atmosphere for equilibration of the food articles on the moving belt 4. The vaporized cryogenic liquid from immersion freezing area 30, being more dense and heavy, naturally settles in the equilibration area 22, which is lower than said immersion freeze area 30. Baffle and internal circulating fan structure (not shown), as well as an exhaust vent 27, may also be utilized to circulate the vapor of the cryogenic liquid about the articles of food in the equilibration area 22.

In the same manner, as just described in relation to the equilibration area 22, the dense cold vapor of the cryogenic liquid will circulate over the inclined belt 3 toward the infeed end 2 of apparatus 1, pre-cooling the outer moving articles on the belt 3. Again, circulation of the descending vapors, descending from bath 5 to infeed end 2 along the incline, may advantageously be aided by the use of internal circulation fan and baffle structure (not shown).

The paddle wheel construction 17 serves to immerse the articles of food, shown diagrammatically at 18, in the bath of cryogenic liquid 5 in immersion freeze area 5. The time of immersion should be so controlled as to insure that fruits and vegetables normally subject to cryogenic shock upon immersion are removed from contact with the cryogenic liquid of the immersion bath after from 60 to 80% of the mass thereof is frozen. The freezing process is then completed in the equilibration area 22, according to the method of freezing fruits and vegetables normally subject to the effects of cryogenic shock of this invention as fully disclosed hereinbefore.

The conveyor belts 3 and 4 may be empowered in any desired manner, such as by a revolving shaft, shown at 6 and 7, driven by external power means. The paddle wheel structure 17 obviously may be rotated in any desired manner, for example, by fixing said paddle wheel 17 on a centrally located rotating shaft 24.

Although one type of continuous feed food freezing apparatus has been illustrated and discussed, it is clear that other forms of such type of apparatus also could satisfactorily be employed. Furthermore, non-continuous food freezing apparatus which immerse articles of food in a bath of cryogenic liquid in individual batches, such as in a wire basket, may be used according to the method of this invention, detailed hereinbefore, of immersion freezing of articles of food normally subject to cryogenic shock upon immersion in a cryogenic liquid bath.

It is intended that this invention not be limited by the recitation of method of freezing or of apparatus of freezing set forth hereinbefore. Rather, it is intended that this invention be limited solely according to the scope of the following claims.

We claim:
1. A method of freezing a food product selected from the group consisting of fruits and vegetables which undergo cracking and splitting when immersed in a cryogenic liquid and frozen throughout during immersion, which method essentially comprises cooling said product to a temperature slightly above its freezing temperature by heat exchange with cold nitrogen gas; immersing said product in liquid nitrogen at atmospheric pressure and at a temperature of about —320° F. for a time sufficient to freeze to a rigid solid state at least 60% of the total mass of the said product, passing nitrogen vapor evolved from said liquid nitrogen through a zone, said nitrogen vapor having a temperature at the inlet of said zone approximating the —320° F. temperature of said liquid nitrogen a temperature at the exit of said zone not higher than 0° F., withdrawing said product from contact with said liquid nitrogen while an inner core thereof remains in the unfrozen, relatively soft state and constitutes at least 20% of the total product mass, and passing said food product immediately following withdrawal from contact with the liquid nitrogen through said zone in contact with said nitrogen vapor therein for a time period sufficient to allow the inner relatively soft core to be frozen to the rigid solid state and to allow the temperature throughout the product to equalize at a temperature below its freezing temperature.

2. A method of freezing a food product as recited in claim 1, further comprising deriving the first-mentioned cold nitrogen gas from the vapor evolved from said liquid nitrogen.

References Cited by the Examiner

UNITED STATES PATENTS

| | | | |
|---|---|---|---|
| 2,502,527 | 4/1950 | McFarlan | 62—64 |
| 3,039,276 | 6/1962 | Morrison | 62—64 |

A. LOUIS MONACELL, *Primary Examiner.*

R. S. AULL, *Assistant Examiner.*